(12) United States Patent
Mangold et al.

(10) Patent No.: US 6,319,974 B1
(45) Date of Patent: Nov. 20, 2001

(54) METHOD FOR IMPROVING THE STABILITY OF POLYMERS

(75) Inventors: Helmut Mangold, Rodenbach; Mario Scholz, Gründau; Uwe Schachtely, Rodenbach; Klaus Deller, Hainburg, all of (DE)

(73) Assignee: Degussa AG, Düsseldorf (DE)

( * ) Notice: Subject to any disclaimer, the term of this patent is extended or adjusted under 35 U.S.C. 154(b) by 0 days.

(21) Appl. No.: 09/420,582

(22) Filed: Oct. 19, 1999

(30) Foreign Application Priority Data

Oct. 21, 1998 (DE) .............................. 198 48 480

(51) Int. Cl.$^7$ ............................................ C08K 3/22
(52) U.S. Cl. ................ 524/413; 524/435; 524/783; 524/785
(58) Field of Search ................... 524/435, 413, 524/783, 785

(56) References Cited

U.S. PATENT DOCUMENTS

| | | | |
|---|---|---|---|
| 3,855,171 | * 12/1974 | Wegehaupt et al. | ............... 528/30 |
| 3,922,246 | * 11/1975 | Ceyzeriat et al. | ............... 260/37 SB |
| 4,558,109 | * 12/1985 | McAfee | ............... 528/15 |
| 5,256,486 | * 10/1993 | Ariagno et al. | ............... 428/447 |
| 5,260,372 | * 11/1993 | Toporcer et al. | ............... 524/785 |
| 5,672,330 | * 9/1997 | Hartmann et al. | ............... 423/610 |
| 5,736,308 | * 4/1998 | Schmuck et al. | ............... 430/512 |

FOREIGN PATENT DOCUMENTS

| | | |
|---|---|---|
| 1963118 | 7/1970 | (DE) . |
| 19650500 | 6/1998 | (DE) . |
| 0609533 | 8/1994 | (EP) . |

OTHER PUBLICATIONS

DE 4302896, abstract, Aug. 1994.*

* cited by examiner

Primary Examiner—Margaret Moore
(74) Attorney, Agent, or Firm—Smith, Gambrell & Russell, LLP

(57) ABSTRACT

The stability of polymers against the action of heat and flames is improved in that a pyrogenically produced titanium dioxide containing iron oxide is added to the polymers.

8 Claims, 3 Drawing Sheets

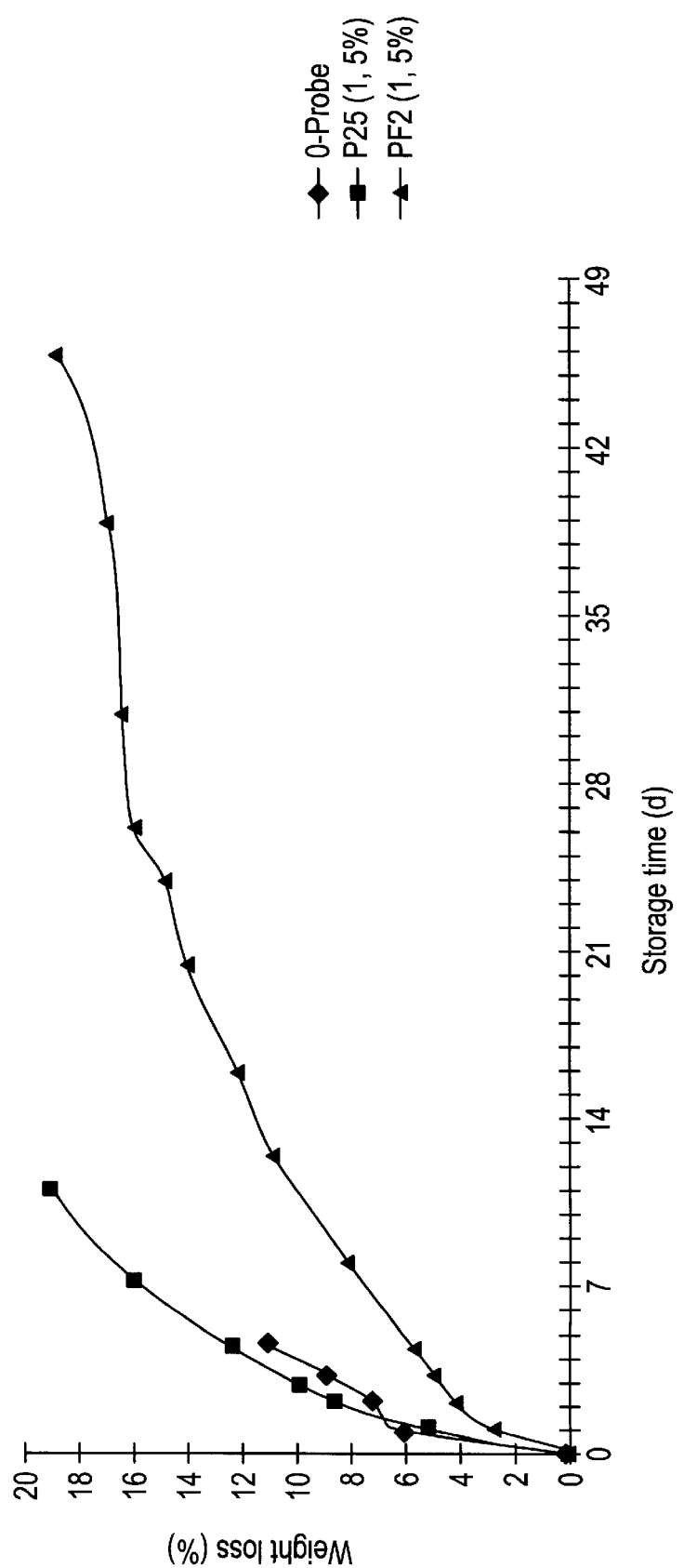

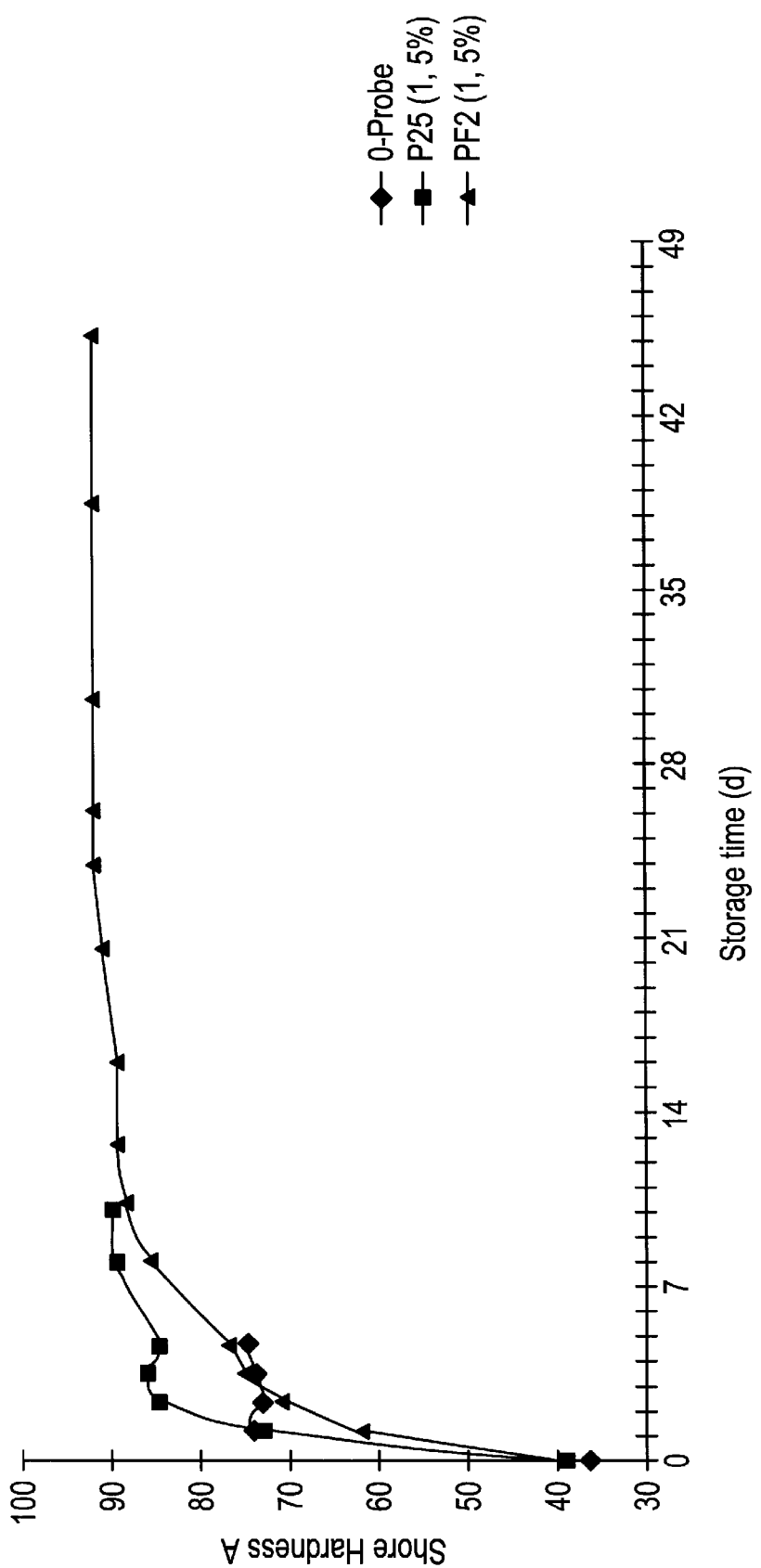

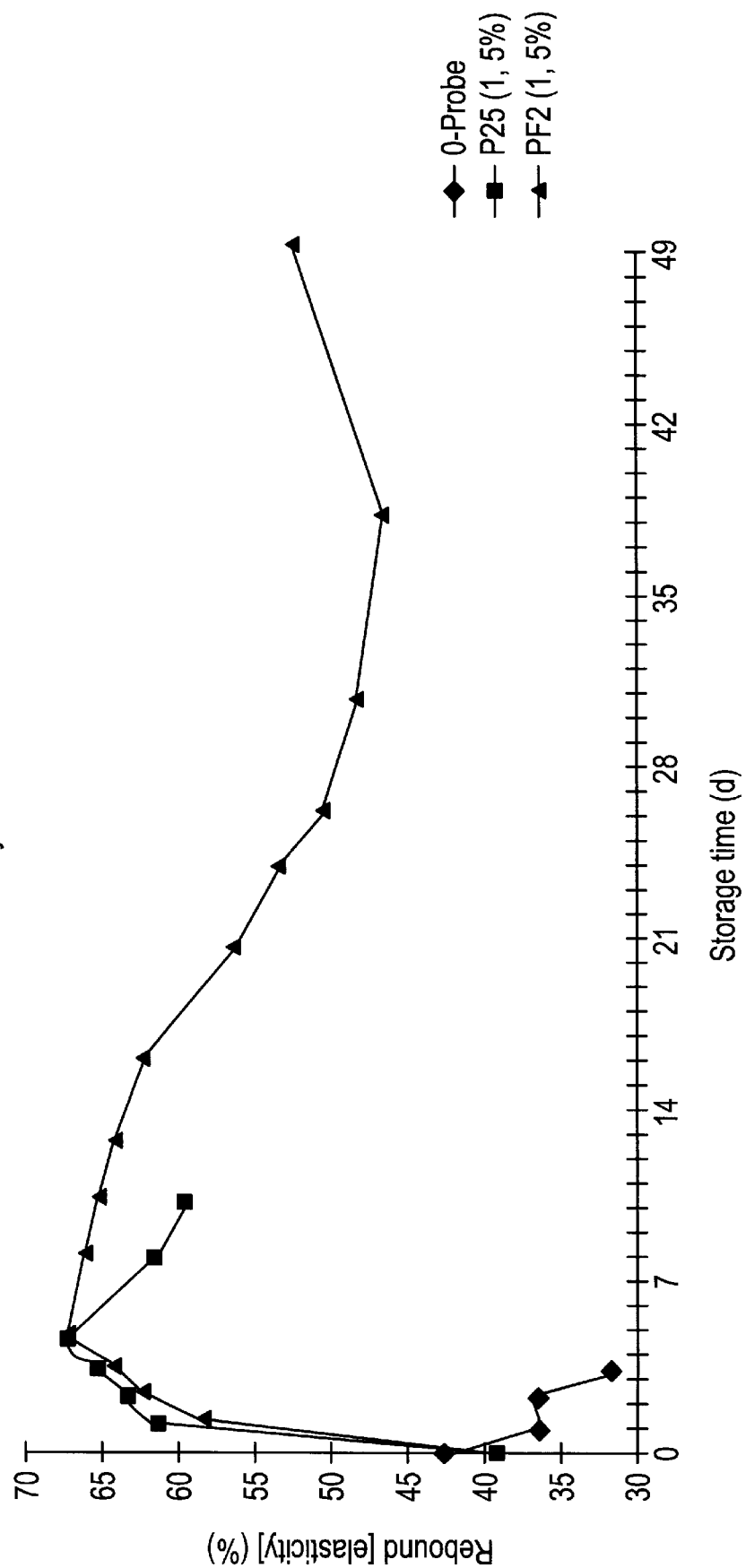

METHOD FOR IMPROVING THE STABILITY OF POLYMERS

INTRODUCTION AND BACKGROUND

The present invention relates to a method for improving the stability of polymers against the action of heat and flames.

The use of pyrogenically produced titanium dioxide in silicone rubber is known (see the publication series Pigmente No. 56 Degussa Aktiengesellschaft 1989, page 27).

SUMMARY OF THE INVENTION

The invention relates to a method for improving the stability of polymers against the action of heat and flames which is carried out by adding a pyrogenically produced titanium dioxide, containing iron oxide in an amount of 0.05 to 50% by weight, to the polymers, before or during the processing.

Silicone rubber, silicone oil, synthetic and/or natural rubbers or gum can be used as polymers in accordance with the present invention.

BRIEF DESCRIPTION OF DRAWINGS

The present invention will be further understood with reference to the drawings which relate to liquid silicon polymers produced according to the present invention and, wherein:

FIG. 1 is a graph of heat stability expressed as weight loss versus storage time;

FIG. 2 is a graph of heat stability expressed as shore hardness A versus storage time; and FIG. 3 is a graph of heat stability expressed as elasticity versus storage time.

DETAILED DESCRIPTION OF INVENTION

The present invention will now be described in further detail.

In a preferred embodiment of the invention a titanium dioxide containing iron oxide like the one described in the document EP-B 0,609,533 can be used. This document is relied on and incorporated herein by reference.

The titanium dioxide containing iron oxide can be added to the polymers, e.g., before or during the vulcanization or cross-linking.

The pyrogenically produced titanium dioxide containing iron oxide can be added to the polymers in an amount of 0.05 to 20% by weight, preferably 0.5 to 2.5% by weight based on the total weight of the batch.

The method of the invention has the advantage that the polymers have an improved stability against the action of heat and flames. That means that the splitting off of organic materials is distinctly reduced at rather high temperatures. This achieves, in addition, an improved protective action against flames.

EXAMPLE 1
(No Addition of Pyrogenic Titanium Dioxide, Control Test)

Batch of a 2-component silicone rubber (liquid silicone rubber) without the addition of titanium dioxide (control test). A two-component silicone rubber of the Bayer company, trade name Silopren LSR 2040 is used as base component (Addition cross-linking).

After a homogeneous mixing of the two components with a dissolver the vulcanization takes place at 180° C. for 10 min.

Test plates (approximately 10×15 cm) 6 mm thick are produced.

The test plates are conditioned at 80° C. in an oven until constancy of weight (approximately 1 day).

A warm storage test is performed in order to test stability of the composition against heat.

A 5×7 cm test strip is stored for this in a circulating air oven at 275° C.

The weight loss, Shore hardness A and elasticity are measured on this test strip after different storage times.

The results are shown graphically in FIGS. 1 to 3. The control is identified as O-probe.

It was determined as a result of these tests that the specimen without protective heat stabilization is already vitrified and shattered, that is, destroyed, after 4 days of warm storage.

EXAMPLE 2
(Addition of Pyrogenic Titanium Dioxide)

A two-component silicone rubber of the Bayer company, trade name Silopren LSR 2040 is used as base component (addition crosslinking).

1.5% by weight pyrogenic titanium dioxide (titanium dioxide P 25 S, Degussa A G Frankfurt) (relative to the total batch) is worked into one of the components with a dissolver for 5 min. The vulcanization and production of the test plates takes place thereafter, as described in example 1.

5×7 cm test strips are stored at 275 ° C. The weight loss, Shore hardness A and the elasticity are measured.

The specimens vitrify within 8 to 11 days.

The results are shown graphically in FIGS. 1 to 3. Example 2 is identified as P25.

EXAMPLE 3
(Addition of Pyrogenic Titanium Dioxide Containing Iron Oxide in Accordance with the Invention)

A two-component silicone rubber of the Bayer company, trade name Silopren LSR 2040 is used as base component (addition crosslinking).

1.5% by weight pyrogenic titanium dioxide containing iron oxide (Name V PF 2; described in EP-B 0,609,533; manufacturer Degussa A G Frankfurt) (relative to the total batch) is worked into one of the components with a dissolver for 5 min. The vulcanization and production of the test plates takes place thereafter, as described in example 1.

After different storage times at 275° C. the weight loss, Shore hardness A and the rebound elasticity of the specimen are measured.

The results are shown graphically in FIGS. 1 to 3. Example 3 is indicated a PF2.

No vitrification occurs in these specimens within a storage time of up to 7 weeks.

The physico-chemical data of the pyrogenic titanium dioxides used and containing iron oxide are indicated in table 2.

TABLE 1

Comparison of the warm storage behavior of liquid silicone rubber (LSR) at 275° C.

| LSR without titanium dioxide according to example 1 | LSR with 1.5% by weight pyrogenic titanium dioxide P 25 according to example 2 | LSR with 1.5% by weight pyrogenic titanium dioxide VP PF 2 containing iron oxide according to example 3 |
| --- | --- | --- |

TABLE 1-continued

Comparison of the warm storage behavior of
liquid silicone rubber (LSR) at 275° C.

| vitrification (destruction after 4 days) | vitrification after approximately 6 to 11 days | no vitrification within 49 days |
|---|---|---|
| | weight loss after 7 days: approximately 16% by weight | weight loss after 7 days: approximately 8 % by weight |

TABLE 2

Comparison of the physico-chemical data of VP PF 2 and P 25

| | P 25 | VP PF 2 |
|---|---|---|
| $TiO_2$ (% by weight) | >99.5 | >94 |
| $Fe_2O_3$ (% by weight) | <0.01 | 2 ± 1 |
| BET surface (m2/g) | 50 ± 15 | 50 ± 15 |
| X-ray structure | primarily anatase | primarily anatase |
| average size of the primary particles (nm) | 30 | 30 |
| color | white | yellowish |

The manufacture of the pyrogenic titanium dioxide containing iron oxide (VP PF 2) takes place as described in EP patent 0,609,533 in its example No. 2 with the single change that the throughput of $FeCl_3$ was reduced to 30 g/h so that an iron-oxide content of 2.0% by weight $Fe_2O_3$ resulted in the pyrogenically produced product.

Evaluation: The improvement of the heat protection (stability against heat) by the titanium dioxide containing iron oxide can be clearly seen from FIGS. 1 to 3, especially from the curve of FIG. 1 (weight loss, that is, splitting off of organic material from the silicone polymer).

Further variations and modifications of the foregoing will be apparent to those skilled in the art and are intended to be encompassed by the claims appended hereto.

German priority application 198 48 480.1 filed Oct. 21, 1998 is relied on and incorporated herein by reference.

We claim:

1. A method of improving the stability of a polymer against the action of heat and flames, comprising:
    adding to said polymer a pyrogenically produced titanium dioxide containing iron oxide, with an iron-oxide content of 0.05 to 50% by weight.

2. The method according to claim 1, wherein the titanium dioxide containing iron oxide is added to the polymer before or during the vulcanization or cross-linking of the polymer.

3. The method according to claim 1, wherein the amount of pyrogenically produced titanium dioxide containing iron oxide added to said polymer is 0.05 to 20%.

4. The method according to claim 3, wherein the amount of pyrogenically produced titanium dioxide containing iron oxide added to said polymer is 0.5 to 2.5% by weight.

5. The method according to claim 1, wherein said polymer is a member selected from the group consisting of silicone rubber, silicone oil and synthetic or natural rubber.

6. An unvulcanized polymer composition having improved stability against the action of heat and flames, comprising:
    a polymer, and
    0.05 to 50% by weight of a pyrogenically produced titanium dioxide containing iron oxide with an iron oxide content of 0.05 to 50% by weight.

7. A vulcanized polymer composition comprising the composition of claim 6.

8. An article comprising the vulcanized polymer composition according to claim 7.

* * * * *